(12) United States Patent
Svensson et al.

(10) Patent No.: US 10,968,815 B2
(45) Date of Patent: Apr. 6, 2021

(54) CONTROL SYSTEM AND CONTROL METHOD FOR AN INTERNAL COMBUSTION ENGINE

(71) Applicant: VOLVO TRUCK CORPORATION, Gothenburg (SE)

(72) Inventors: Stig Arne Svensson, Torslanda (SE); Lennart Langervik, Onsala (SE); Björn Jacobsson, Onsala (SE); Viktor Huggare, Västerås (SE); Bengt Lassesson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 317 days.

(21) Appl. No.: 15/781,129

(22) PCT Filed: Dec. 7, 2015

(86) PCT No.: PCT/EP2015/078859
§ 371 (c)(1),
(2) Date: Jun. 3, 2018

(87) PCT Pub. No.: WO2017/097330
PCT Pub. Date: Jun. 15, 2017

(65) Prior Publication Data
US 2018/0355786 A1    Dec. 13, 2018

(51) Int. Cl.
*F01L 3/00* (2006.01)
*F02B 21/00* (2006.01)
(Continued)

(52) U.S. Cl.
CPC .............. *F02B 21/00* (2013.01); *F02B 29/02* (2013.01); *F02B 37/12* (2013.01); *F02D 41/0002* (2013.01); *F02D 41/0007* (2013.01); *F02D 41/008* (2013.01); *F02D 41/401* (2013.01); *F02B 2037/125* (2013.01); *F02D 2200/0406* (2013.01); *Y02T 10/12* (2013.01); *Y02T 10/40* (2013.01)

(58) Field of Classification Search
CPC .................................. F02M 23/006; F01L 3/20
USPC ......................................... 123/189, 188.9, 26
See application file for complete search history.

(56) References Cited

U.S. PATENT DOCUMENTS

| 4,684,374 A | 3/1987 | Kobayashi et al. |
| 4,825,843 A * | 5/1989 | Novy ...................... F02B 17/00 123/308 |

(Continued)

FOREIGN PATENT DOCUMENTS

| DE | 2632015 A1 | 1/1978 |
| EP | 2385230 A1 | 11/2011 |

OTHER PUBLICATIONS

International Search Report (dated Aug. 8, 2016) for corresponding International App. PCT/EP2015/078859.

*Primary Examiner* — Long T Tran
*Assistant Examiner* — James J Kim
(74) *Attorney, Agent, or Firm* — Venable LLP; Jeffri A. Kaminski (57) ABSTRACT

A control system for an internal combustion engine (ICE) is provided including a control unit configured for operating an electrically controlled valve for supplying compressed air to at least one cylinder depending on an operational mode for the ICE. A method for controlling such an ICE (200), and a computer are also provided.

28 Claims, 4 Drawing Sheets

(51) Int. Cl.
    F02B 29/02    (2006.01)
    F02B 37/12    (2006.01)
    F02D 41/00    (2006.01)
    F02D 41/40    (2006.01)

(56) References Cited

U.S. PATENT DOCUMENTS

| | | | | |
|---|---|---|---|---|
| 5,617,835 | A * | 4/1997 | Awarzamani | F01L 3/20 |
| | | | | 123/188.7 |
| 6,138,616 | A * | 10/2000 | Svensson | F02B 29/06 |
| | | | | 123/26 |
| 9,523,293 | B2 * | 12/2016 | Puetzer | F02M 35/10222 |
| 2007/0283939 | A1 * | 12/2007 | Berger | F01L 3/06 |
| | | | | 123/585 |
| 2009/0205612 | A1 * | 8/2009 | Wermuth | F02D 41/402 |
| | | | | 123/406.19 |
| 2009/0288619 | A1 * | 11/2009 | Koneda | F01L 1/16 |
| | | | | 123/90.11 |
| 2010/0331143 | A1 * | 12/2010 | Jager | B60W 10/02 |
| | | | | 477/167 |
| 2011/0288715 | A1 * | 11/2011 | Schaffeld | F02B 33/34 |
| | | | | 701/31.4 |
| 2011/0288741 | A1 * | 11/2011 | Schaffeld | F02B 33/34 |
| | | | | 701/102 |
| 2012/0186249 | A1 | 7/2012 | Guzzell et al. | |
| 2012/0240909 | A1 | 9/2012 | Geyer | |

* cited by examiner

CONTROL SYSTEM AND CONTROL METHOD FOR AN INTERNAL COMBUSTION ENGINE

BACKGROUND AND SUMMARY

The invention relates to a control system for an internal combustion engine (ICE). The invention also relates to a corresponding method for controlling an ICE, and to a thereto related computer program.

In connection with combustion engines, turbo chargers are often utilized which comprise a turbine which is driven by the flow of exhaust gases. The energy which is thus absorbed by the turbine is then transferred via a shaft to a compressor which is arranged to compress the air on the intake side of the combustion engine and thus increase the amount of air in the combustion chamber. This means that a larger amount of fuel can be fed to a combustion chamber in an engine, thus increasing the torque and power of the engine.

In turbocharged diesel engines intended for, for example, commercial vehicles the available torque from the engine during take-off is often somewhat inadequate. The reason for this is that an engine equipped with a turbocharger performs worse than a normally aspirated engine at low rpm's due to that the turbo charger is a hindrance of the aspiration. The fact that the engine has a take-off performance which is worse than a normally aspirated engine means that the amount of air which is typical for a turbocharged diesel engine is not supplied. This in turn means that the amount of fuel which is injected in the engine must be limited at low rpm's, in order to minimize the amount of smoke from incomplete combustion due to lack of air. The turbo charger will with increased exhaust energy supply an additional amount of air which will permit an increased amount of fuel and by that increased engine torque and engine power.

The above-mentioned sequence of events is furthermore unfavorable since it contributes to reduced performance during the take-off phase of the engine. The engine will furthermore be perceived by users as "insufficient" during the take-off phase, since it has been necessary to limit the amount of fuel supplied during the initial "aspirating engine" phase, also known as turbo-lag.

One way of eliminating the above mentioned turbo lag, is to feed an amount of compressed air to the engine during this take-off phase where engine response is required. For example, U.S. Pat. No. 6,138,616 discloses a device in a combustion engine which is preferably equipped with a turbo unit, where the turbo function can be initiated earlier than in previously known devices and which adds to the starting torque of the engine. In particular, U.S. Pat. No. 6,138,616 discloses an apparatus for supplying air to an internal engine where a secondary valve arrangement is used to supply additional air to the cylinder after the ordinary air supply from the main valve.

However, even though the disclosed apparatus provides a great improvement over prior art engines, there is still further room for improvement of the apparatus described in U.S. Pat. No. 6,138,616.

It is desirable to provide a control system and method for improving the performance of a turbocharged combustion engine.

According to an aspect of the invention, a control system is provided for controlling air supply to an internal combustion engine (ICE), the ICE including at least one cylinder comprising an inlet for supplying the air to the at least one cylinder, the system comprising a container for compressed air storage, a conduit for supplying the compressed air from the container to the inlet of the at least one cylinder, a mechanically controlled valve arrangement for supplying the compressed air to the at least one cylinder from the conduit, the mechanically controlled valve arrangement comprising a first valve for supplying ordinary air to the at least one cylinder, the first valve being movable between a closed position in which the ordinary air cannot be supplied to the at least one cylinder and an open position in which the ordinary air is supplied to the at least one cylinder, the first valve including a passage connected to the conduit for supplying the compressed air to the at least one cylinder therethrough, an electrically controlled valve arranged with the conduit and provided for controlling the supply of the compressed air to the at least one cylinder, and a control unit connected to and configured for operating the electrically controlled valve, wherein the control unit is configured for operating the electrically controlled valve for supplying the compressed air to the at least one cylinder depending on an operational mode for the ICE.

During operation of the ICE, air and fuel is allowed into the cylinder. According to the disclosure, the air provided to the ICE is a combination of an amount of ordinary air (e.g. provided by means of a turbo charger through a normal air inlet channel into the cylinder) and an amount of compressed air. The compressed air is supplied to the cylinder from a container for compressed air storage when the amount of ordinary air provided to the cylinder is not sufficient for allowing a desired operation of the ICE. Such a situation may for example arise when the turbocharger is not (yet) fully operational.

By means of the inclusion of an electrically controlled valve being operated by a control unit and working together with the mechanically controlled valve arrangement, it may be possible to carefully adjust an amount of additional fuel that is supplied to the cylinder based on a current operational mode for the ICE, thereby improving the general operation of the ICE. As indicated, the control system may for example be used for overcoming turbo-lag. This in turn eliminates the perception of the ICE as being insufficient with regard to the take-off torque.

In an embodiment, the operational mode for the ICE may be dependent on a current torque demand for the ICE. The control level of an accelerator pedal or other torque demander may for example be used for determining a desired torque level. The control unit may also be arranged in operational connection with e.g. a further control element for controlling the ICE and having knowledge of the current torque demand. The electrically controlled valve may thereby be open and additional fuel added in line with the maximized torque demand vs. pre-defined smoke level.

In another embodiment, the operational mode for the ICE is dependent on a maximum emission level for the ICE. In such an embodiment it is typically a desire to minimize the emissions emitted by the ICE during the start-up operation where the control system is active.

Preferably, the control unit is configured to determine the amount of compressed air that is injected into the cylinder through the mechanically controlled valve arrangement. Such an implementation allows for a high level of controllability in regards to an air/fuel ratio in the cylinder. Preferably, the container for compressed air storage is thus provided with a sensor for measuring a current pressure within the container. Such a sensor is arranged in communication with the control unit controlling the electrically controlled valve. The control unit may for example be an ECU/ECM (Electronic Control Unit/Engine Control Module) comprised with the ICE.

In addition to the above, the pressure level determined using the sensor/control unit is preferably also used for determining if the compressed air pressure is sufficient in the container (typically following a determination of air mass within the container, performed by the control unit). In case it is determined that the pressure level (and/or air mass) is below a predetermined threshold, for example where there could be problems as to other uses for compressed air, the control system may be configured to refrain from providing the compressed air to the cylinder. One possible scenario may for example be when the container for compressed air storage is also connected to e.g. air brakes of a vehicle comprising the ICE.

Furthermore, it is preferred to not initiate supply of the compressed air before the ICE reaches its operational temperature, for example approximately 80 deg. C. Thus, the control unit is preferably arranged to also have knowledge as to the operational temperature of the ICE.

In a preferred embodiment the ICE is comprised with a vehicle. The vehicle could for example be a truck or a car. However, the ICE could also be comprised with construction equipment, etc. It should however be understood that the ICE in an alternative embodiment could be provided in a stationary arrangement, such as for example an electrical power station (e.g. Genset). The disclosed control system may in such an embodiment shorten the startup period for the Genset.

The ICE could for example be a diesel engine or an Otto engine, or a hybrid in between. The ICE could also be arranged as a component of a hybrid system, such as a hybrid vehicle. It should be noted that a vehicle is not necessary limited to a land based vehicle, rather also marine applications (e.g. a boat) are possible and within the scope of the invention.

In a preferred embodiment, the operational mode for the ICE is dependent on an operational mode for the vehicle. In particular, when the ICE is comprised with a vehicle, the disclosed control system allows to overcome an unwanted turbo-lag prior to a boost pressure of an adequate level has been built. In a specific implementation, the duration for when applying the compressed air may be around 1-2 seconds, before the turbocharger is fully operational, that is, typically before a sufficient boost pressure may be provided by the turbocharger, and/or alternatively when a predetermined time limit has been reached. Furthermore, over 1000 rpm (for the ICE) an activation period for the electrically controlled valve is from 0.8-0.5 second, depending on engine speed and engine load. In addition, there is a desire to closely monitor the boost pressure to ensure that there is a suitable hand-off between the application of the compressed air and the ordinary air provided by means of the turbocharger.

Thus, the disclosed control system is preferably only active when a boost pressure is below a set threshold. Exemplary related operational modes include for example a stop-and-go implementation for a vehicle. Advantages resulting from the inventive concept include the possibility of reducing the size of the ICE, thereby reducing the weight of the vehicle, resulting in reduction of fuel consumption for the vehicle.

Furthermore, it may in some implementations be desirable to arrange the control unit to receive information relating to gear shifting for the vehicle. Such information may then be used in operating the electrically controlled valve. Specifically, in some embodiments the electrically controlled valve may be activated prior to a gear change. In another embodiment the electrically controlled valve is not activated when a clutch is disengaged, or gearbox is in neutral, or during gear shifting. Such control of when to activate the electrically controlled valve inhibit the injection of extra air when it is not beneficial, reduces wasteful compressed air consumption and may also prevent from running low on compressed air in the mentioned container. The control unit is thus preferably arranged to have knowledge of how the vehicle is shifted between gears.

In a preferred embodiment, the disclosed control system further comprises an electrically controlled fuel injection arrangement for injection of the additional fuel to the at least one cylinder, wherein the electrically controlled fuel injection arrangement is in electrical communication with the control unit, and the control unit is further configured to control the operation of the electrically controlled fuel injection arrangement. The electrically controlled fuel injection arrangement and the electrically controlled valve are preferably activated together for boosting the operation of the ICE, thereby allowing for an increased (even further) amount of torque to be provided by the ICE, also when a turbocharger of the ICE, is at least partly inactive. This implementation should be seen as an alternative to the embodiment focusing on emission reduction (e.g. the mentioned stop-and-go scenario).

According to another aspect of the present invention there is provided a method for controlling a supply of compressed air to a cylinder of an internal combustion engine (ICE) in addition to an ordinary supply of air comprising the steps of determining an operational mode for the ICE, activating an electrically controlled valve for supplying the compressed air to the cylinder depending on the determined operational mode for the ICE. This aspect provides similar advantages as discussed above in relation to the previous aspect of the invention.

The method may for example be performed by a control unit or as a computer program comprising program code means for performing the method steps when the program is run on a computer. The computer program may be provided on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The present invention will now be described more fully hereinafter with reference to the accompanying drawings, in which currently preferred embodiments of the invention are shown. This disclosed concept may, however, be embodied in many different forms and should not be construed as limited to the embodiments set forth herein; rather, these embodiments are provided for thoroughness and completeness. Like reference characters refer to like elements throughout.

Figure 1A:
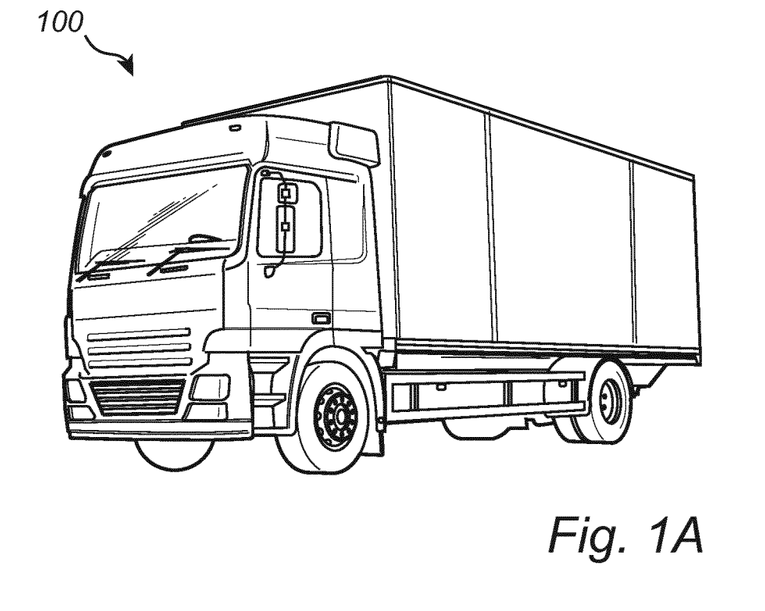
FIGS. 1A and 1B illustrate different types of vehicles equipped with a valve arrangement according to an embodiment.
Figure 1B:
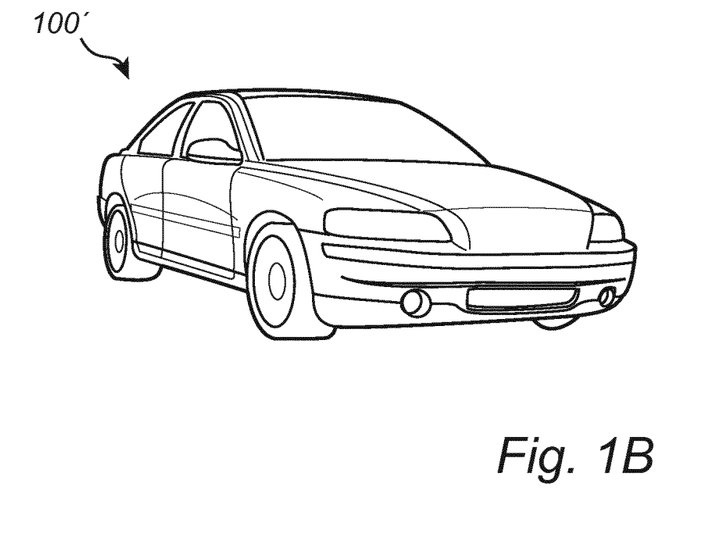

Referring now to the drawings and to FIGS. 1A and 1B in particular, there is in FIG. 1A depicted an exemplary vehicle, here illustrated as a truck 100 comprising an internal combustion engine (ICE) in which a control system may be incorporated. The control system may of course be implemented also in a car 100', as shown in FIG. 1B, a working machine or in any engine, such a stationary engine, having a supply of compressed air.

Figure 2:
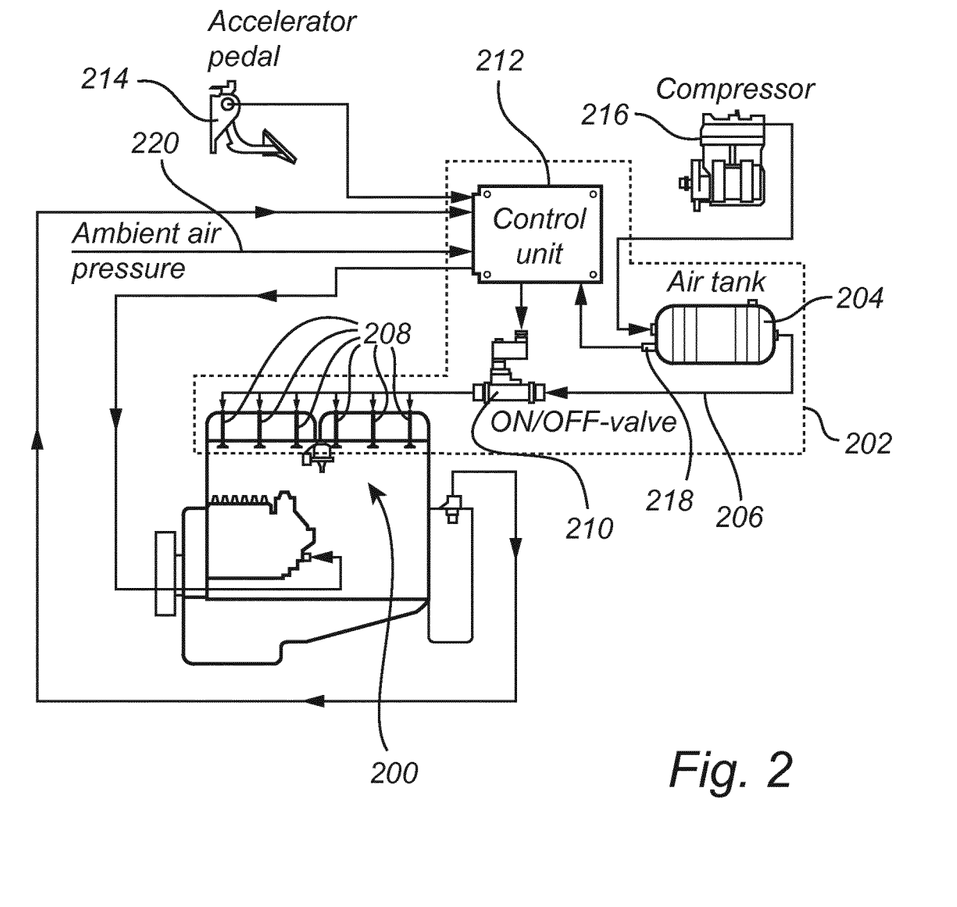
FIG. 2 schematically illustrates an ICE and a control system according to a currently preferred embodiment.

Turning now to FIG. 2, schematically illustrating an ICE 200 and a control system 202 according to a currently preferred embodiment. The control system 202 comprises a container for compressed air storage 204, a conduit 206 for supplying the compressed air from the container 204 to the inlet of the at least one cylinder of the ICE 200. The control system 202 further comprises the mechanically controlled valve arrangement 208 for supplying the compressed air to the at least one cylinder from the conduit 206. The function and design of the valve arrangement will be described in detail below, with reference to FIG. 3. Another example of such a mechanically controlled valve arrangement can be found in the above mentioned U.S. Pat. No. 6,138,616, hereby incorporated by reference.

The control system 202 further comprises an electrically controlled valve 210 arranged with the conduit 206 and provided for controlling the supply of the compressed air to the at least one cylinder of the ICE 200, and a control unit 212 connected to and configured for operating the electrically controlled valve 210. Preferably, each cylinder of the ICE 200 may typically comprise a mechanically controlled valve arrangement 208.

The control unit 212 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein. The control unit 212 may be provided as a separate unit and/or may at least partly form part of an electronic control unit comprised with the truck 100. The control unit 212 may also be connected to e.g. a communication interface (such as e.g. a CAN bus or similar, or a dedicated communication interface) of the truck 100.

The control unit 212 is preferably arranged in communication with an accelerator pedal 214 (in case of e.g. the truck 100). A gear shift arrangement (not shown, manual or automatic) may also be connected to the control unit 212.

In addition to the above, the container 204 is advantageously arranged to receive air from a compressor 216, and provided with a sensor 218 for monitoring an air pressure level within the container 204. Still further, the control unit 212 may be connected to a further sensor 220 for measuring an ambient air pressure. It should be understood that the sensor 218 may be differently positioned (connecting stems/pipes, etc.) for monitoring the air pressure. The measured air pressure combined with knowledge of the volume of the container 204 and possibly the temperature in the vicinity of and/or inside of the container may be used for determining the air mass within the container 204.

The ICE 200 typically comprises a conventional turbocharger, and the control system 202 is arranged to function alongside the turbocharger. It should however be understood that the control system 202 also may be useful where a turbocharger is unavailable. In such implementations, there may be necessary to place constrains onto the container 204, typically by selecting an in comparison larger container (and thereto related compressor 216 with an in comparison high capacity). Such a scenario may for example exist where only "extra" torque is needed during transients but the ICE is able to handle normal conditions.

Figure 3:
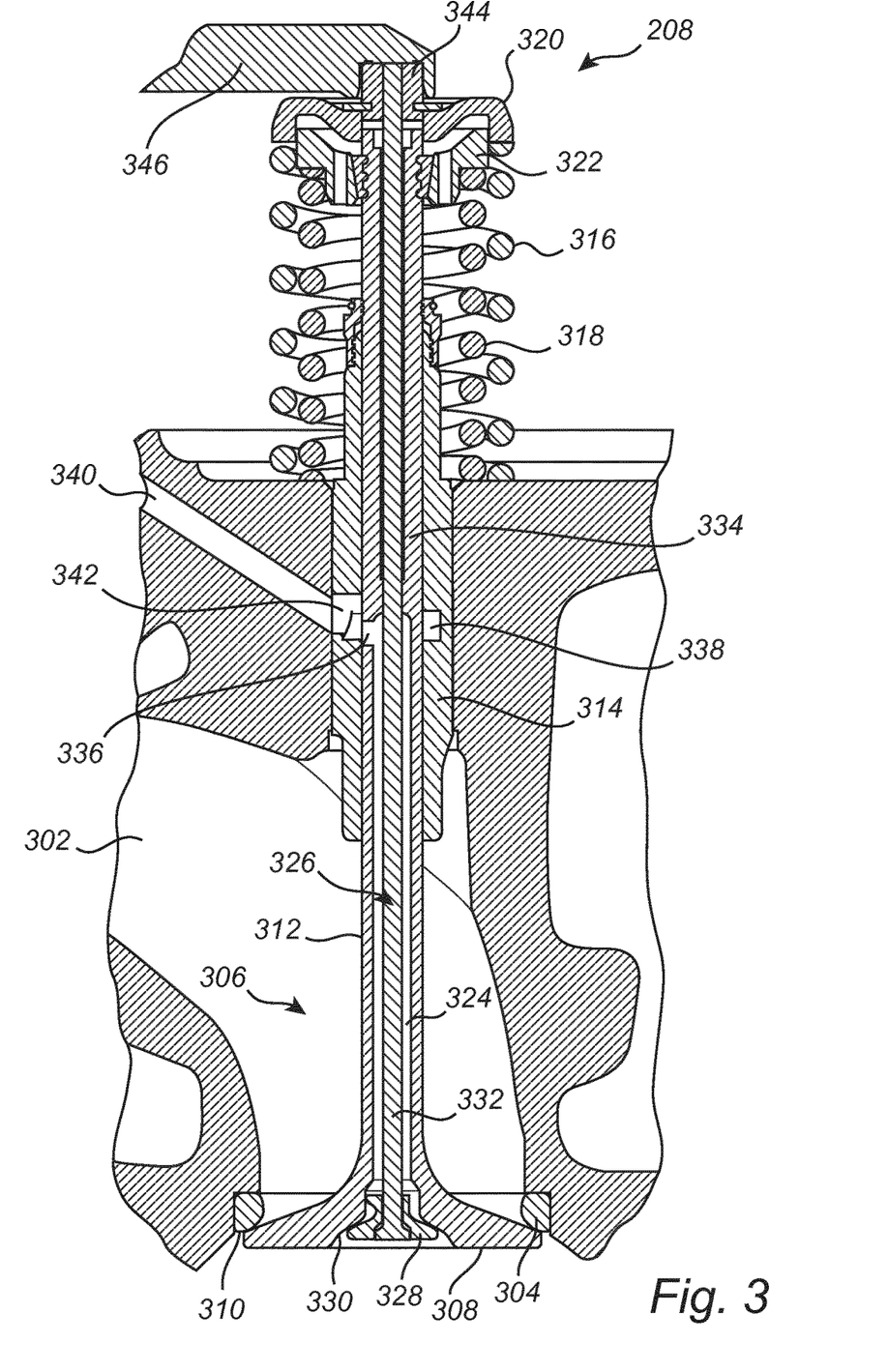
FIG. 3 shows an exemplary mechanically controlled valve arrangement according to an embodiment.

Turning to FIG. 3, showing an exemplary mechanically controlled valve arrangement 208 according to an embodiment of the invention. The mechanically controlled valve arrangement 208 is arranged at an air intake port 302 of each of the different cylinders of the ICE 200. The air intake port 302 is used for feeding ordinary air to the cylinder, e.g. from the mentioned turbocharger. At the point where the air intake port 302 enters the cylinder, there is arranged a valve seat 304 against which a first valve 306 is arranged. To this end, the first valve 306 comprises a first valve head 308, which is in contact with a lower, essentially circular edge 310. The first valve head 308 is connected to a first valve-stem 312, which runs in an essentially jacket shaped valve guide 314. The function of the first valve 306 corresponds to the ordinary valve function of an ICE for the supply of ordinary air to the combustion in the different cylinders.

Using the force from an external valve spring 316 and an internal valve spring 318, the first valve head 308 is influenced to be in contact with the valve seat 304. To be more exact the first and second, external and internal, valve springs 316, 318 are in contact with, and press against, first and second, external and internal, spring washers 320, 322, respectively, where the second spring washer 322, via a valve lock, is in connection with the first valve-stem 312. The lower part of the first valve stem 312 is essentially tube-shaped, and comprises an internal passage 324 which at its lower end is widened. The internal passage 324 houses a second valve 326 with a second valve head 328 which is in contact with a further valve seat in the form of an inner surface 330 of the first valve head 308. The second valve head 328 is furthermore connected to a second valve stem 332 which has its extension inside the passage 324.

The upper part of the first valve stem 312 is shaped with a through-going passage-section 334, the inner dimensions of which essentially correspond to the outer dimensions of the second valve stem 332. The internal passage 324 in the lower part of the first valve stem 312 has a diameter which is larger than the diameter of the second valve stem 332 to allow a flow of compressed air in the internal passage 324. There is furthermore arranged along the circumference of the first valve stem 312 at least one inlet 336, and more preferably three inlets, arranged equidistantly along the circumference of the first valve stem 312. The valve guide 314 furthermore comprises an inner groove 338 forming a cavity between valve guide 314 and the first valve stem 312. A feeder channel 340 is connected to the cavity via a valve guide aperture 342 arranged in the side wall of the valve guide 314. It is preferable that the resulting ellipsoid opening of the feeder channel 340, adjacent to the valve guide aperture 342, is completely covered by the valve guide aperture 342.

In the normal position of the valve arrangement 300, i.e. when the first valve 306 is in contact with the valve seat 304 and the second valve 326 is in contact with the inside of the first valve head 308, the cavity formed between the groove 338 of the valve guide 314 and the first valve stem 312 is aligned with the at least one inlet 336 in the first valve stem 312. In order to connect compressed air to the cylinder the feeder channel 340 which terminates at the valve guide aperture 342 in the valve guide 314.

Compressed air from the air tank 204 can be supplied to the feeder channel 340 via a control valve and further on to the lower internal passage 324 of the first valve stem 312. The compressed air is thus led towards the engine cylinder via the second valve 326 which is continuously opened and closed by a camshaft of the engine. The second valve-stem 332 is at least along a certain section dimensioned so as to be a good fit against the lower end of the upper passage-section 334. This enables transfer of heat between the second valve-stem 332 and the first valve stem 312, at the same time as it provides a sealing function which prevents air from flowing upwards along the upper passage-section 334. It also protects the second valve-stem 332 from the risk of buckling, especially during high engine speed operation.

When a predefined engine load case occurs, which activates the system, the above described air channels 340/342/336/338/324 are pressurized with compressed air from the air tank 204 via and electrical controlled valve 210 controlled by the control unit 212. The internal valve 326 opens first by the camshaft and a small portion of the compressed air is injected into the cylinder at T.D.C. The following action is, after the gap between the valve depressor 344 and the main valve 308 is closed and the internal valve is fully open 326, the main inlet valve opens from valve seat 304 and the engine aspirate air to the cylinder via normal air inlet channel 302. In the same moment as the main inlet valve opens 308, the air feeder holes in the valve stem 336 in the main inlet valve moves downwards with the opening motion and leaves the cavity 328 in valve guide 314 with compressed air. In FIG. 3, a valve actuating member 346 is arranged to transfer movement of the camshaft to the valve depressor 344.

This means that the air feed holes 336 in the valve stem becomes blocked by the lower part of the valve guide 314 and no compressed air can be fed into the cylinder. This means that no compressed air is added as long as the main inlet valve 308 is open. This feature reduces the air consumption. When the main inlet valve 308 return to its valve seat 304, the feeder holes 336 returns in to the by compressed air pressurized cavity 338 within the valve guide 314. This means that compressed air is now fed into the cylinder after the main inlet valve 308 has closed. The internal valve 326 in the main inlet valve 308 remains open until the cam curve on the camshaft and the spring force 316 close the valve 326 and the compression stroke follows with additional fuel added to the combustion.

Figure 4:
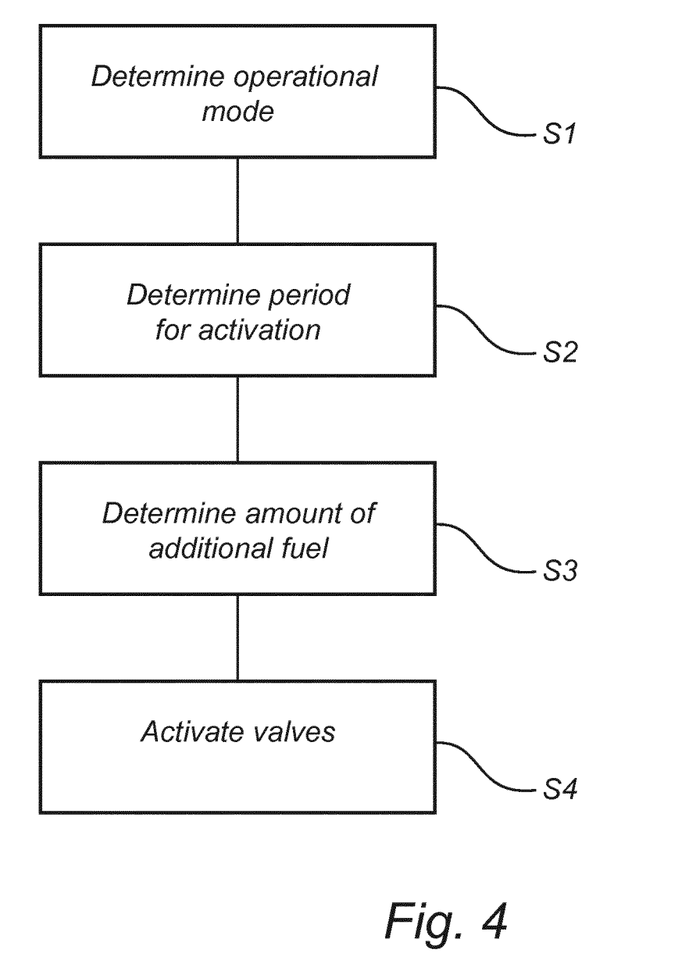
FIG. 4 conceptually illustrates the processing steps for performing the disclosed method.

According to one exemplary method of operation, with further reference to FIG. 4, the control unit 212 receives information e.g. over the mentioned CAN communication interface, for example from the sensor 218 measuring a current pressure level at the container for compressed air storage 204, a current setting for the accelerator pedal 214, the operational temperature of the ICE 200, a current turbo pressure, etc. The information is processed by the control unit 212 for determining, S1, a current operational mode of the ICE 200. In some embodiments of the invention, e.g. the truck 100 may be equipped with an interface for controlling a driving setting for the truck 100, for example for driving the truck 100 while emitting a reduced amount of particulates with exhaust gases from the ICE 200. This setting may also be controlled using the control interface as mentioned above. In some embodiments, the truck 100 may as an alternative be operated in an "improved torque mode" where also further fuel is provided to the ICE, together with the compressed air provided by means of the electrically controlled valve 210.

Based on the operational mode for the ICE 200, the period for activating, S2, the electrically controlled valve 210 is adjusted (time for open state of the electrically controlled valve 210). The activation period and the amount of compressed air (air mass) to be supplied to the cylinder of the ICE 200 is in a preferred implementation calculated, model based, from air injection duration, air pressure and estimated air temperature at the injector nozzle. Such control of when to activate the electrically controlled valve 210 may, as mentioned above, inhibit the injection of extra air when it is not beneficial, reduces wasteful compressed air consumption and may also prevent from running low on compressed air in the mentioned container. The model based approach may be used for forming an envelope of when to allow activation of the electrically controlled valve 210. The model may for example take into account engine speed, air supply pressure, activation time or angle and valve mechanics data, etc. Accordingly, there is preferred to form an estimation of the air mass to be injected into the ICE.

In an embodiment, the amount of compressed air that is to be provided to the cylinder is correlated with an amount (mass) of additional fuel to be provided to the cylinder. The control unit 212 is accordingly also configured for such a determination, S3.

Subsequently, the above mentioned electrically controlled fuel injection arrangement (not explicitly shown) provided with the ICE 200 is activated, S4, together with electrically controlled valve 210 for boosting the operation of the ICE 200, thereby e.g. providing an additional torque to the truck 100.

In summary, the above example relates to a control system for controlling air supply to an internal combustion engine (ICE), the ICE including at least one cylinder comprising an inlet for supplying the air to the at least one cylinder, the system comprising a container for compressed air storage, a conduit for supplying the compressed air from the container to the inlet of the at least one cylinder, a mechanically controlled valve arrangement for supplying the compressed air to the at least one cylinder from the conduit, the mechanically controlled valve arrangement comprising a first valve for supplying ordinary air to the at least one cylinder, the first valve being movable between a closed position in which the ordinary air cannot be supplied to the at least one cylinder and an open position in which the ordinary air is supplied to the at least one cylinder, the first valve including a passage connected to the conduit for supplying the compressed air to the at least one cylinder therethrough, an electrically controlled valve arranged with the conduit and provided for controlling the supply of the compressed air to the at least one cylinder, and a control unit connected to and configured for operating the electrically controlled valve, wherein the control unit is configured for operating the electrically controlled valve for supplying the compressed air to the at least one cylinder depending on an operational mode for the ICE.

The disclosed control system provides a measure for controlling a supply of compressed air the cylinder of the ICE. An electrically controlled valve comprised with the control system may be operated to carefully control the amount of compressed air to be supplied based on a current operational mode for the ICE The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims. The invention can for example be used in different kinds of combustion engines, e.g. diesel engines and gasoline engines. The invention is furthermore not limited to use in connection with turbo-charged engines, but can also be used for supplying compressed air in engines not comprising a turbocharger.

The invention claimed is:

1. A control system for controlling air supply to an internal combustion engine (ICE), the ICE including at least one cylinder comprising an inlet for supplying the air to the at least one cylinder, the system comprising: a container for compressed air storage; a conduit for supplying the compressed air from the container to the inlet of the at least one cylinder; a mechanically controlled valve arrangement for supplying the compressed air to the at least one cylinder from the conduit, the mechanically controlled valve arrangement comprising a first valve for supplying ordinary air to the at least one cylinder, the first valve being movable between a closed position in which the ordinary air cannot be supplied to the at least one cylinder and an open position in which the ordinary air is supplied to the at least one cylinder, the first valve including a passage connected to the conduit for supplying the compressed air to the at least one cylinder therethrough; an electrically controlled valve arranged with the conduit and provided for controlling the supply of the compressed air to the at least one cylinder, and a control unit connected to and configured for operating the electrically controlled valve, wherein the control unit is configured for operating the electrically controlled valve for supplying the compressed air to the at least one cylinder depending on an operational mode for the ICE, and wherein the ICE includes a turbocharger, and the electrically controlled valve is activated to supply the compressed air to the at least one cylinder when a pressure of the turbocharger is determined to be below a predetermined threshold.

2. The control system according to claim 1, wherein the operational mode for the ICE is a current torque demand for the ICE.

3. The control system according to claim 1, wherein the operational mode for the ICE is dependent on a maximum emission level for the ICE.

4. The control system according to claim 1, wherein the control unit is configured to determine the amount of compressed air that is injected into the cylinder through the mechanically controlled valve arrangement.

5. The control system according to claim 1, wherein the ICE is comprised with a vehicle.

6. The control system according to claim 5, wherein the operational mode for the ICE is dependent on an operational mode for the vehicle.

7. The control system according to claim 5, wherein the control unit is configured to receive information relating to gear shifting for the vehicle, and the operation of the electrically controlled valve is further based on the received information.

8. The control system according to claim 1, wherein the ICE is comprised with a stationary engine arrangement.

9. The control system according to claim 1, wherein the control unit is further arranged to receive an indication of a torque demand for the ICE and to activate the electrically controlled valve to supply the compressed air to the at least one cylinder dependent on the received torque demand.

10. The control system according to claim 1, further comprising an electrically controlled fuel injection arrangement for injection of additional fuel to the at least one cylinder, wherein the electrically controlled fuel injection arrangement is in electrical communication with the control unit, wherein the control unit is further configured to control the operation of the electrically controlled fuel injection arrangement.

11. The control system according to claim 10, wherein the electrically controlled fuel injection arrangement and the electrically controlled valve are activated together for boosting the operation of the ICE.

12. The control system according to claim 1, further comprising a sensor for monitoring the air pressure within the container.

13. The control system according to claim 1, wherein the electrically controlled valve is only activated if an air mass within the container is above a predetermined threshold.

14. The control system according to claim 13, wherein the predetermined threshold is dependent on a temperature within the vicinity of and/or at the container.

15. The control system according to claim 13, wherein the predetermined threshold is dependent on a speed (rpm) of the ICE.

16. The control system according to claim 1, wherein the mechanically controlled valve arrangement comprising a second valve movably arranged within the first valve and configured to control the flow of the compressed air to the cylinder, wherein the second valve being movable between a closed position in which the compressed air cannot be supplied to the at least one cylinder and an open position in which the compressed air may be supplied to the at least one cylinder.

17. The control system according to claim 16, wherein the second valve comprising a second valve head movably arranged relative to an inner surface of the first valve for opening and closing, respectively, the passage in the first valve.

18. The control system according to claim 1, wherein the first valve is adapted to be mechanically controlled via a valve actuating member.

19. The control system according to claim 18, wherein the second valve is adapted to be mechanically controlled via the valve actuating member.

20. A method for controlling a supply of compressed air to a cylinder of an internal combustion engine (ICE) in addition to an ordinary supply of air, wherein the ICE includes a turbocharger and the method comprises
determining a pressure of the turbocharger,
activating an electrically controlled valve for supplying the compressed air to the cylinder when the pressure of the turbocharger is determined to be below a predetermined threshold.

21. The method according to claim 20, wherein the mechanically controlled valve arrangement comprising a first valve for supplying the ordinary air to the cylinder, the first valve being movable between a closed position in which the ordinary air cannot be supplied to the at least one cylinder and an open position in which the ordinary air is supplied to the at least one cylinder, wherein the first valve including an internal passage in communication with the cylinder, and the method comprises: supplying the compressed air the cylinder via the internal passage.

22. The method according to claim 21, wherein the valve arrangement comprising a second valve movably arranged within the first valve and configured to control the flow of compressed air to the cylinder, wherein the second valve being movable between a closed position in which the compressed air cannot be supplied to the at least one cylinder and an open position in which the compressed air may be supplied to the at least one cylinder and, the method comprises: supplying the compressed air to the cylinder via the internal passage when the second valve is in the open position.

23. The method according to claim 20, wherein the system comprising:
a container for compressed air storage; and a conduit for supplying the compressed air from the container to the inlet of the at least one cylinder, wherein the electrically controlled valve is arranged with the conduit and provided for controlling the supply of the compressed air to the at least one cylinder.

24. The method according to claim 20, further comprising the step of:
determining the amount of compressed air that is injected into the cylinder through the mechanically controlled valve.

25. The method according to claim 13, wherein the control system is further provided with an electrically controlled fuel injection arrangement for injection of additional fuel to the at least one cylinder, wherein the electrically controlled fuel injection arrangement, and the method further comprises: activating the electrically controlled fuel injection arrangement together with electrically controlled valve for boosting the operation of the ICE.

26. A control unit configured for performing the method according to claim 13.

27. A computer comprising a computer program for performing the steps of claim 13 when the program is run on the computer.

28. A control system for controlling air supply to an internal combustion engine (ICE), the ICE including at least one cylinder comprising an inlet for supplying the air to the at least one cylinder, the system comprising: a container for compressed air storage; a conduit for supplying the compressed air from the container to the inlet of the at least one cylinder; a mechanically controlled valve arrangement for supplying the compressed air to the at least one cylinder from the conduit, wherein the electrically controlled valve is only activated if an air mass within the container is above a predetermined threshold, the predetermined threshold being dependent on a speed (rpm) of the ICE, the mechanically controlled valve arrangement comprising a first valve for supplying ordinary air to the at least one cylinder, the first valve being movable between a closed position in which the ordinary air cannot be supplied to the at least one cylinder and an open position in which the ordinary air is supplied to the at least one cylinder, the first valve including a passage connected to the conduit for supplying the compressed air to the at least one cylinder therethrough; an electrically controlled valve arranged with the conduit and provided for controlling the supply of the compressed air to the at least one cylinder, and a control unit connected to and configured for operating the electrically controlled valve, wherein the control unit is configured for operating the electrically controlled valve for supplying the compressed air to the at least one cylinder depending on an operational mode for the ICE.

* * * * *